Figure 1:
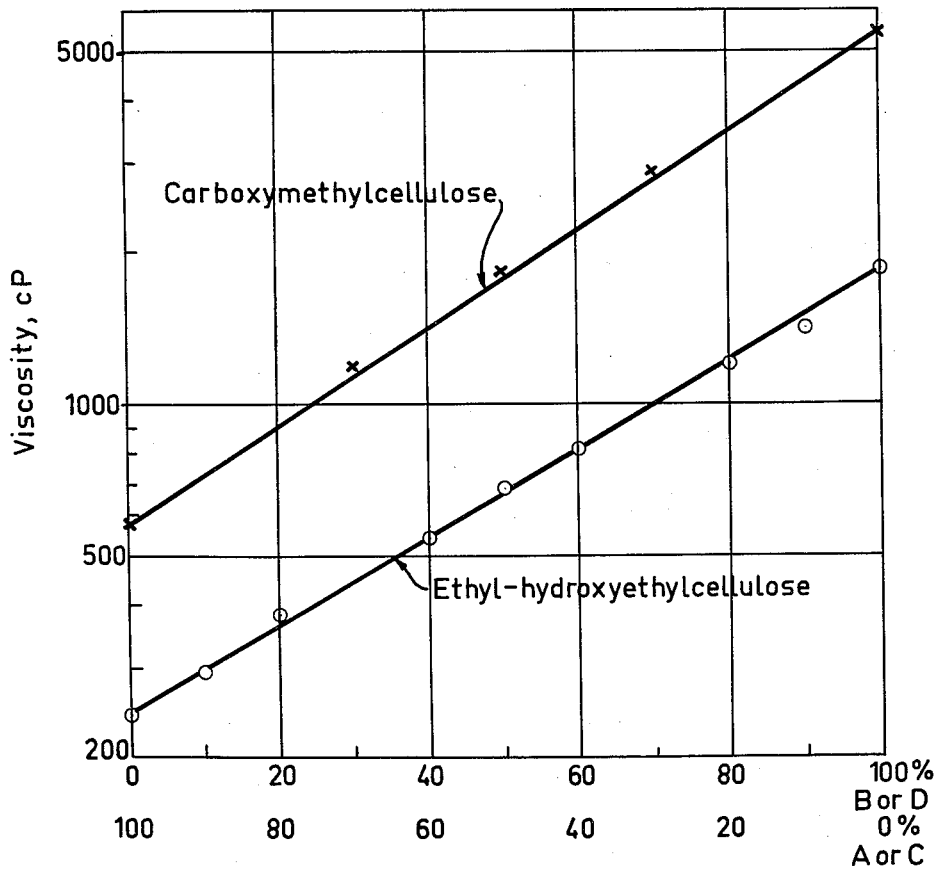

Dec. 26, 1961  F. P. NYBERG  3,014,808
CELLULOSE DERIVATIVE COMPOSITIONS
Filed Feb. 2, 1959  2 Sheets-Sheet 1

INVENTOR
*Folke Petrus Nyberg*

BY *Stevens Davis Miller & Mosher*
ATTORNEYS

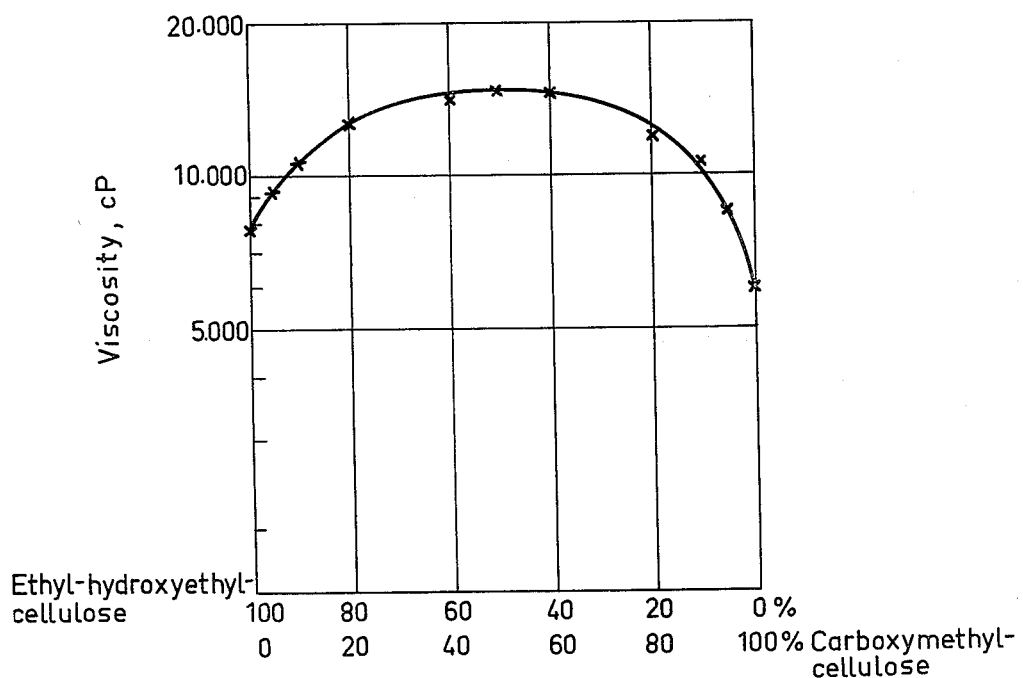

United States Patent Office 3,014,808
Patented Dec. 26, 1961

3,014,808
CELLULOSE DERIVATIVE COMPOSITIONS
Folke Petrus Nyberg, Ornskoldsvik, Sweden, assignor to Mo och Domsjö Aktiebolag, Ornskoldsvik, Sweden, a corporation of Sweden
Filed Feb. 2, 1959, Ser. No. 790,627
Claims priority, application Sweden, Feb. 21, 1958
3 Claims. (Cl. 106—197)

The present invention relates to cellulose derivative compositions useful as adhesives, thickening agents and the like, and is more particularly concerned with a cellulose derivative composition comprising a water-soluble ethyl-hydroxyethylcellulose and a water-soluble ionic cellulose derivative, said two ingredients being present in proportions within the range of 5 to 95% by weight of one of them and correspondingly 95 to 5% by weight of the other, based on the sum of these two ingredients.

Many cellulose derivatives have found extensive use as adhesives, thickening agents, dispersing agents and the like for a variety of industrial purposes. Examples of such uses include base materials in cosmetic and pharmaceutical ointments and salves, bonding agents in tablets, thickening and stabilizing agents in foodstuffs, thickening agents in shoe colors, thickening and dispersing agents in detergent compositions, emulsifiers and binding agents in insecticidal and similar compositions, additives to coating compositions, impregnating compositions and sizes for paper, adhesives for paperboard and paper, warp sizes, thickening agents in emulsion paints and filling putties, foundry core binders and adhesives, wall-paper pastes etc. In many such applications it is desirable, on dissolving the cellulose derivative in water to obtain a solution exhibiting a high viscosity at a low content of cellulose derivative or in other words to obtain the highest possible thickening effect at a given concentration of the thickening agent. This effect is usually achieved by using a cellulose derivative of a high molecular weight for which purpose it is necessary to see to it that degradation of the cellulose during preparation of the cellulose derivative is minimized.

The viscosity of a mixture of two water-soluble cellulose derivatives of different viscosities, e.g. two different ethyl-hydroxyethylcellulose or two different carboxymethylcelluloses, can readily be calculated from the known viscosities of the ingredients (at a certain given concentration). In a graph where the logarithm of the viscosity (log $\eta$) is plotted against the percentage composition of the mixtures, the logarithm of the viscosity of a mixture will be close to the straight line connecting log $\eta$ for each of the two components. Of course, the total concentration of the solutions is presumed to be constant.

It was surprisingly found that a mixture of ethyl-hydroxyethylcellulose and at least one anionic cellulose derivative, when dissolved in water, has a viscosity which is substantially above the viscosity which could be expected on the basis of the viscosities of the two components in accordance with the rule explained above. As long as the viscosities of the two components are not too different the viscosity will even often be substantially above the viscosity of the most viscous of the two components.

Water-soluble ionic cellulose derivatives to be used in the composition of this invention include e.g. water-soluble types of carboxymethylcellulose, carboxyethylcellulose, sulfomethylcellulose, sulfoethylcellulose and cellulose sulfate, including water-soluble salts of these cellulose derivatives.

The above-mentioned water-soluble cellulose derivatives are known per se. The solubility characteristics of cellulose derivatives of these types depend, as in the case of cellulose derivatives generally, on several factors and among them primarily on the degree of substitution, i.e. the average number of substituent groups per anhydroglucose unit in the cellulose molecule. As a general rule, a low degree of substitution results in solubility in aqueous alkali only, and a higher degree of substitution gives solubility in both aqueous alkali and water. For cellulose ethers containing for example ethyl groups it is also to be noted that the solubility in water is reduced on further increase of the degree of substitution above a certain optimum value, due to the fact that ethyl groups are of a hydrophobic nature in themselves. However, the solubility depends not only on the degree of substitution, but also on the average degree of polymerization or average molecular weight of the cellulose derivative in that the solubility increases somewhat with decreasing degree of polymerization. Another factor which largely influences the solubility characteristics of cellulose derivatives, consists in the conditions of reaction under which the cellulose derivative in question is prepared. The manner in which the reaction conditions affect the solubility is that if they are such as to favor a uniform substitution, i.e. the substituent groups are uniformly distributed along the cellulose molecule chain, solubility in water will be obtained at a degree of substitution which is lower than that at which solubility is obtained with a non-uniform substitution. On account of these circumstances it is impossible to specify definite limits for the degree of substitution within which solubility in water is obtained. The maximum degree of substitution for the cellulose derivatives contemplated here is 3.0 except in the case of the hydroxyethyl group the degree of substitution of which is unlimited (since it contains a hydroxyl group which can be etherified by another hydroxyethyl group etc. to form ethyleneoxy ether chains). As regards such water-soluble cellulose derivatives of the types contemplated here, which are available in practice, it can be mentioned, however, that the degree of substitution generally lies within the following ranges: Ethyl-hydroxyethylcellulose 0.2 to 2.0 as regards ethyl and 0.2 to 2.0 as regards hydroxyethyl groups; carboxymethylcellulose 0.4 to 1.5; sulfomethylcellulose 0.1 to 1.0; sulfoethylcellulose 0.4 to 1.5; cellulose sulfate 0.1 to 1.0. For carboxyethylcellulose it is reported that solubility in water requires the use of at least 1 molecule of etherification agent per anhydroglucose unit. However, since these water-soluble cellulose derivatives and methods for their preparation are well-known to those skilled in the art and described in the literature, it is not considered necessary to specify the degree of substitution for the purposes of this invention.

The increase in viscosity will generally be noticeable already when a rather small proportion of one component is admixed to the other. To achieve an increase in viscosity sufficient for practical purposes, however, both components should be present in proportions of at least 5% based on the weight of the mixture, i.e. the mixing ratio by weight of ethyl-hydroxyethylcellulose to the ionic cellulose derivative ranges from 5/95 to 95/5. Preferably mixing ratios within the range of 80/20 to 20/80, by weight, will be employed.

Of course, compositions within the scope of this invention may contain other arbitrary additions. It will be noted that the percentages stated above and in the appended claims relate only to the cellulose derivative components and that any other substances added are not included.

The invention is illustrated by the examples set forth below and the accompanying drawings, wherein FIGURE 1 is a graph illustrating the viscosities of various mixtures of two ethyl-hydroxyethylcelluloses of different viscosities as well as those of various mixtures of two carboxymethylcelluloses of different viscosities, and FIGURE 2 is a graph illustrating the viscosities of various mixtures of an ethyl-hydroxyethylcellulose and a carboxymethylcellulose.

In the examples below as well as on the drawings, the term "viscosity" means the viscosity measured at 20° C. measured with a Brookfield viscometer one day after preparation of the solution. When nothing else is stated, viscosity in a 2% solution is intended. All percentages are by weight.

EXAMPLE 1

This example is intended to show the viscosity values obtained by mixing two cellulose derivatives which are similar in structure but have different viscosities and illustrates the rule explained hereinbefore for calculating the viscosity of the mixture. In these experiments two different ethyl-hydroxyethylcelluloses and two different carboxymethylcelluloses were used. These had the following characteristics.

(A) Ethyl-hydroxyethylcellulose:
   Viscosity—240 cp.
   Chemical composition—
      15.7% of ethoxyl ($OC_2H_5$)
      13.5% of ethylene oxide ($OC_2H_4$)
   Salt content—0.4% of NaCl
(B) Ethyl-hydroxyethylcellulose:
   Viscosity—1840 cp.
   Chemical composition—
      17.0% of ethoxyl
      12.4% of ethylene oxide
   Salt content—2.2% of NaCl
(C) Carboxymethylcellulose (Na salt):
   Viscosity—580 cp.
   Degree of substitution—0.66
   Salt content—6.8% of NaCl
(D) Carboxymethylcellulose (Na salt):
   Viscosity—5400 cp.
   Degree of substitution—0.66
   Salt content—2.2% of NaCl The products A and B and the products C and D were mixed in varying proportions, and determinations of viscosities were carried out on the mixtures. The results are set forth in Table I below.

Table I

| Mixing proportions (A:D and C:D resp.) | Viscosity, cp. Ethyl-hydroxyethyl-cellulose (A+B) | Viscosity, cp. Carboxymethyl-cellulose (C+D) |
|---|---|---|
| 100:0 | 240 | 580 |
| 90:10 | 296 | |
| 80:20 | 380 | |
| 70:30 | | 1,190 |
| 60:40 | 545 | |
| 50:50 | 680 | 1,850 |
| 40:60 | 815 | |
| 30:70 | | 2,910 |
| 20:80 | 1,190 | |
| 10:90 | 1,410 | |
| 0:100 | 1,840 | 5,400 |

The results are also set forth graphically in FIGURE 1 where the viscosity values are plotted on a logarithmic scale against the percentage compositions of the mixtures. It is seen that the viscosities of the various mixtures correspond well to those which can be calculated in accordance with the rule explained above, i.e. the logarithms of the viscosities of the mixtures lie close to the straight line connecting log $\eta$ of the two components of the mixtures.

EXAMPLE 2

A high-viscosity ethyl-hydroxyethylcellulose having a viscosity of 7715 cp. and containing 18.0% of ethoxyl and 16.0% of ethylene oxide (corresponding to a degree of substitution of 0.88 for ethoxyl and 0.82 for ethylene oxide) and a salt content of 3.7% of NaCl was mixed in varying proportions with a high-viscosity carboxymethylcellulose (sodium salt) of the viscosity 5940 cp., degree of substitution 0.47 and salt content 4.7% of NaCl. The viscosities of the mixtures were determined. The results are set forth in Table II below.

Table II

| Proportions of ethyl-hydroxyethylcellulose to carboxymethyl-cellulose | Viscosity, cp. | Proportions of ethyl-hydroxyethylcellulose to carboxymethyl-cellulose | Viscosity, cp. |
|---|---|---|---|
| 100:0 | 7,715 | 40:60 | 14,330 |
| 95:5 | 9,230 | 20:80 | 11,980 |
| 90:10 | 10,450 | 10:90 | 10,600 |
| 80:20 | 12,670 | 5:95 | 8,320 |
| 60:40 | 13,930 | 0:100 | 5,940 |
| 50:50 | 14,530 | | |

These values are plotted in FIGURE 2 in the same manner as in FIGURE 1. It is apparent that the logarithms of the mixture viscosities are always substantially above the straight line connecting log $\eta$ of the two components.

EXAMPLE 3

A low-viscosity ethyl-hydroxyethylcellulose (viscosity 439 cp.; 15.7% ethoxyl, 13.5% ethylene oxide; salt content 0.4% NaCl) was mixed with an equal amount of low-viscosity carboxymethylcellulose (viscosity 463 cp.; degree of substitution 1.1; salt content 0.3% NaCl).

A 1% aqueous solution of this mixture exhibited a viscosity of 99 cp. The corresponding values of 1% aqueous solutions of the ethyl-hydroxyethylcellulose and the carboxymethylcellulose are 46 cp. and 101 cp. respectively. On the basis of these values the viscosity of a 1% solution of the mixture, calculated in accordance with the rule explained hereinbefore, would be 68 cp.

EXAMPLES 4 TO 7

Various ethyl-hydroxyethylcelluloses were mixed with various ionic cellulose derivatives in 50:50 proportions. The characteristics of the products, the viscosities of the mixtures and the viscosities which should be expected on the basis of the above rule are set forth in Table III.

Table III

| Ex. | Ethyl-hydroxyethylcellulose Viscosity, cp. | Substitution Ethoxyl | Substitution Ethylene oxide percent | Salt, percent NaCl | Ionic cellulose derivative Product | Viscosity, cp. | Substitution | Salt, percent NaCl | Found viscosity of mixture, cp. | Calculated viscosity of mixture, cp. |
|---|---|---|---|---|---|---|---|---|---|---|
| 4 | 224 | 18.4 | 13.4 | 2.5 | Carboxymethyl cellulose (Na salt) | 463 | 1.1 | 0.3 | 495 | 325 |
| 5 | 1,340 | 29.4 | 8.9 | 0.3 | do | 1,175 | 0.55 | 4.2 | 2,220 | 1,270 |
| 6 | 116 | 18.4 | 13.4 | 2.7 | Cellulose sulfate (Na salt) | 110 | 6.3% S | 14% ash | 134 | 113 |
| 7 | 439 | 18.4 | 13.4 | 3.2 | Sulfomethyl cellulose (Na salt) | 512 | 0.25 | | 696 | 475 |

I claim:
1. A cellulose derivative composition comprising 5–95% by weight of (1) a water-soluble ethylhydroxyethylcellulose and correspondingly 95–5% by weight of (2) at least one water-soluble ionic cellulose derivative.
2. A composition as claimed in claim 1 comprising 20–80% by weight of component (1) and correspondingly 80–20% by weight of component (2).
3. A composition as claimed in claim 1 in which component (2) is selected from the class consisting of water-soluble salts of carboxymethylcellulose, carboxyethylcellulose, sulfomethylcellulose, sulfoethylcellulose and cellulose sulfate.

References Cited in the file of this patent
UNITED STATES PATENTS

| | | |
|---|---|---|
| 2,362,761 | Medl | Nov. 14, 1944 |
| 2,558,042 | Cornwell | June 26, 1951 |
| 2,634,214 | Van Dusen et al. | Apr. 7, 1953 |
| 2,753,273 | Cohen et al. | July 3, 1956 |
| 2,778,427 | Cardwell | Jan. 22, 1957 |

OTHER REFERENCES

Modocoll: MO OCH Domsjo AB Pamphlet, July 1952.
Ott et al.: High Polymers, vol. 4 (Cellulose), 2nd ed., 1955, page 948.